Patented July 31, 1945

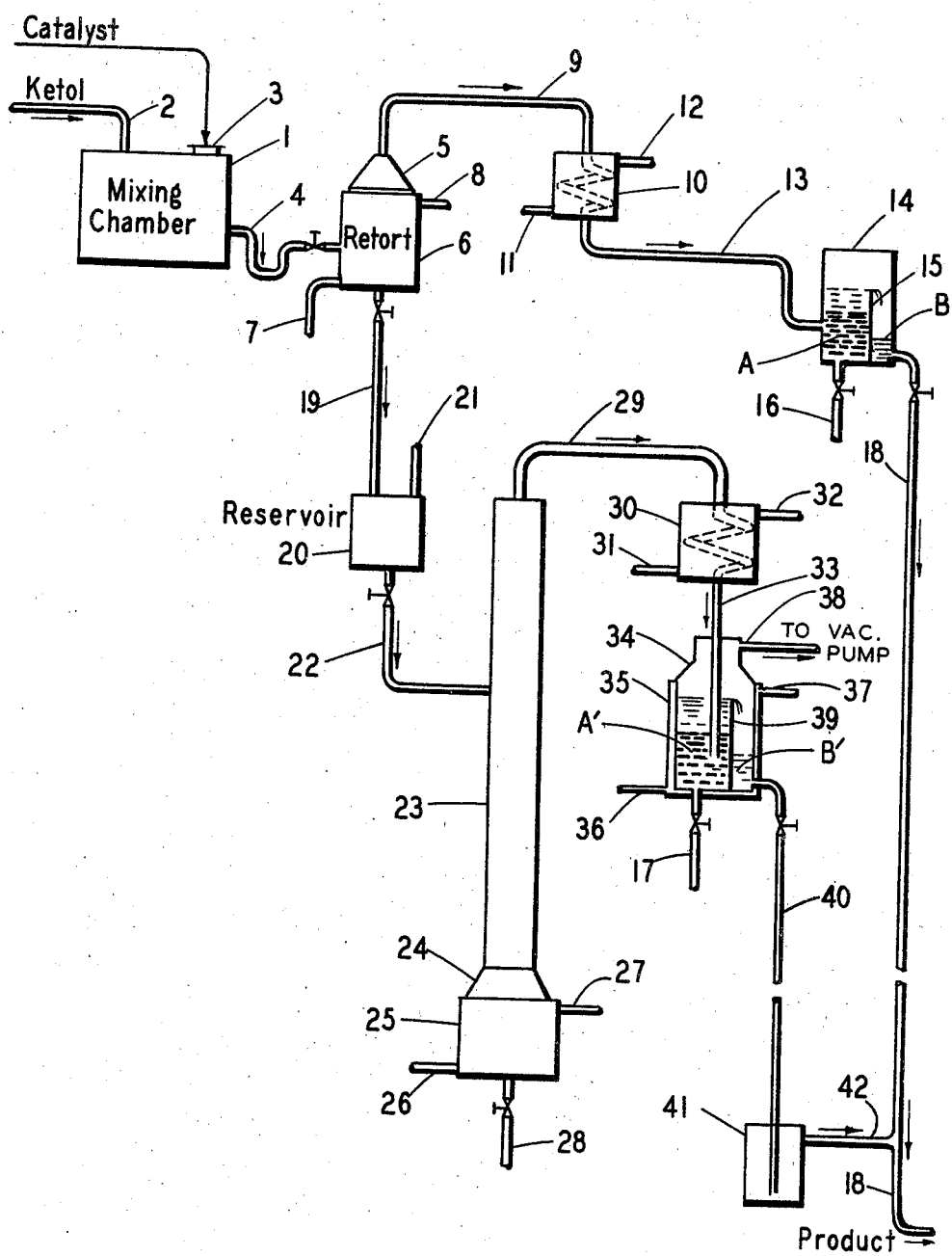

2,380,828

UNITED STATES PATENT OFFICE 2,380,828

PRODUCTION OF UNSATURATED KETONES

Robert R. Dreisbach and George Beal Heusted, Midland, Mich., assignors to The Dow Chemical Company, Midland, Mich., a corporation of Michigan Application July 11, 1940, Serial No. 344,872

9 Claims. (Cl. 260—596)

This invention concerns an improved method of making unsaturated ketones by the dehydration of corresponding ketols. It especially concerns the production of ketones having the general formula:

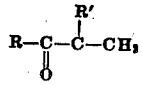

wherein R represents an alkyl group and R' represents hydrogen or an alkyl group.

The formation of unsaturated ketones by dehydration of ketols was reported in German Patent No. 222,551 in 1909 and has since been extensively studied. The usual procedure has been to add a dehydrating agent such as zinc chloride, sulphuric acid, anhydrous oxalic acid, phosphorus pentoxide, or sodium or potassium acid sulphate, etc., to a batch of the ketol and to heat the resultant mixture to distill a mixture of water and the unsaturated ketone product therefrom. The yield of unsaturated ketone is usually low due to formation of tarry by-products. Pepper, in British Plastics 10, 609 (1939) reports that the dehydration is best carried out by treating the ketol with a small proportion of a dehydrating agent, such as phosphorus pentoxide, and a polymerization inhibitor, e. g. hydroquinone, and heating the mixture under vacuum to distill off the ketone product. He reports that when 1-hydroxy-2-methyl-butanone-3 is dehydrated in this way, methyl isopropenyl ketone is produced in about 70 per cent yield.

We have found that the tar formation encountered in the above mentioned usual methods of dehydrating ketols is due to prolonged heating of the ketols in the presence of the dehydrating agent. We have further found that the tar formation may be reduced and the yield of unsaturated ketone improved, by passing the ketol into a heated reaction zone, wherein it is heated at reaction temperatures between 80° and 140° C. together with a dehydration catalyst, and withdrawing the product from the reaction zone at such rates that the contact time, i. e. the time during which the material is retained in the heated reaction zone, is not greater than 30 minutes and preferably does not exceed 20 minutes. For sake of clarity, it may be mentioned that the contact times herein given are calculated in accordance with the equation:

$$\text{Contact time} = \frac{\text{Wt. of material in reaction zone (total reaction time)}}{\text{Wt. of material fed into the reaction zone}}$$

The accompanying drawing is a diagrammatic side view of one form of apparatus suitable for employment in practicing the invention. In the drawing, numeral 1 designates a mixing chamber which is provided with an inlet 2 for ketol and a well or other opening 3 for introduction of a catalyst. A conduit 4 connects the lower portion of chamber 1 with a retort 5. The latter is provided with a jacket 6 through which a heating fluid, e. g. steam, oil, etc., may be passed by means of inlet 7 and outlet 8. Vapor line 9 leads from the top of retort 5 to a condenser 10 which is provided with inlet 11 and outlet 12 for circulating a cooling fluid, e. g. water, brine, etc., therethrough. Conduit 13 connects the condenser 10 with a continuous separator 14 and permits drainage of condensate into the separator. A baffle 15 within the separator divides the latter into chambers A and B, respectively, and permits the lighter of the liquids entering chamber A to overflow the same into chamber B while retaining the heavier liquid in chamber A. A valved outlet 16 permits drainage of the heavier liquid from chamber A. Chamber B is provided near its bottom with a valved outlet 18. The lower portion of retort 5 is connected by means of valved conduit 19 with a reservoir 20 having a vent 21. Another valved conduit 22 leads from the lower portion of reservoir 20 to a distilling column 23. The latter is provided at its lower end with a boiler 24 having a jacket 25 through which a heating fluid may be circulated by means of inlet 26 and outlet 27. Boiler 24 is provided at its bottom with a valved outlet 28. Vapor line 29 leads from the top of distilling column 23 to a condenser 30 which is provided with inlet 31 and outlet 32 for circulating a cooling fluid therethrough. Condenser 30 is connected by means of line 33 with an automatic separator 34. The latter is provided with a jacket 35 having an inlet 36 and an outlet 37 for circulation of a cooling fluid therethrough. Near the top of separator 34 is a vapor line 38 leading to a vacuum pump, not shown. A baffle 39 devides the separator into chamber A' and chamber B' and permits the lighter of the liquids entering chamber A' to overflow the same into chamber B'. Chamber A' is provided near its bottom with a valved outlet 17. A valved line 40 leads from the lower portion of chamber B' into a reservoir 41 below said chamber. The chamber B' and reservoir 41 are of sufficiently different elevation, usually 30 feet or more, so that the pressure created by the liquid in conduit 40 exceeds the difference between the vapor pressure in separator 34 and atmospheric pressure. In other words, the liquid in conduit 40 and reservoir 41 serves as a vacuum seal to permit maintenance of the distilling system under vacuum while permitting withdrawal of condensate from the system at atmospheric pressure. Line 42 connects reservoir 41 with outlet 18 for the product.

In practice of the invention with apparatus such as that just described, a ketol having the general formula:

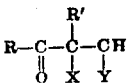

wherein R represents an alkyl radical, R' represents hydrogen or an alkyl radical, and X and Y represent different members of the group consisting of hydrogen and the hydroxyl radical, and a dehydration catalyst are introduced through inlets 2 and 3, respectively, into mixing chamber 1. Examples of ketols which may be employed are 1-hydroxy-butanone-3, 1-hydroxy-2-methyl-butanone-3, 1-hydroxy-2-ethyl-butanone-3, 1-hydroxy-2-methyl-pentanone-3, 1-hydroxy-2,4-dimethyl-butanone-3, 1-hydroxy-2-methyl-heptanone-3, 2-hydroxy-butanone-3, 2-hydroxy-2-methyl-butanone-3, 2-hydroxy-pentanone-3, 2-hydroxy-2,4-dimethyl-pentanone-3, etc. The dehydration catalyst employed is preferably one, such as anhydrous oxalic acid, which is readily soluble in ketols, although other dehydrating agents such as sodium or potassium acid sulphate, phosphorus pentoxide, etc., may be used. The dehydration catalyst is usually employed in amount corresponding to between 1 and 5 per cent of the weight of the ketol, but it may be used in smaller or larger proportion if desired. An agent for inhibiting polymerization of the unsaturated ketone product may also advantageously be added. Examples of suitable polymerization inhibitors are the polyhydric phenols such as catechol, hydroquinone, para-tertiary-butyl-catechol, pyrogallol, etc. The polymerization inhibitor is usually employed in amount corresponding to between 0.1 and 2 per cent of the weight of the ketol, but it may be used in larger or smaller proportion, or be omitted.

The reaction mixture flows from mixing chamber 1 through line 4 into retort 5, wherein it is heated to temperatures between 80° and 140° C., preferably between 120° and 130° C. The mixture is usually heated at atmospheric pressure or thereabout although pressures somewhat below or above atmospheric, e. g. any pressure between .5 and 35 pounds per square inch, absolute, may be employed. Upon being heated in the retort, the ketol undergoes rapid dehydration to form the corresponding unsaturated ketone and a considerable portion of the latter, together with some of the water formed by the reaction, distills off. The residual mixture, which comprises the catalyst, a portion of the water and unsaturated ketone formed by the reaction, and in some instances a minor portion of unreacted ketol, is drained continuously or intermittently into reservoir 20. The rate at which the reaction mixture is fed into the retort and the rate at which it is withdrawn therefrom, e. g. by distillation and drainage, are controlled so that the contact time over which the mixture is retained in the retort does not exceed 30 minutes and preferably is less than 20 minutes. The contact time may be made as brief as desired and yet avoid excessive tar formation. The only objection to very short contact times, e. g. one minute or less, is that the product may contain considerable unreacted ketol, which may be separated and recycled in the process to form additional unsaturated ketone. In practice, contact times of between 10 and 20 minutes are preferably employed.

The distillate from the retort is condensed in cooler 10 and flows therefrom into the continuous separator 14 wherein the unsaturated ketone product is separated from the water. Water is drained from the separator through outlet 16. In most instances the separation is sufficiently complete so that the water layer may be discarded, but in some instances it may advantageously be extracted with a suitable solvent, e. g. benzene, ethyl ether, butyl ether, or ethylene chloride, etc., to recover any residual unsaturated ketone therefrom. The unsaturated ketone product is drained from the separator through outlet 18.

The mixture in reservoir 20 is fed into distilling column 23 which is operated under vacuum so as to distill unsaturated ketone therefrom at a distilling temperature not exceeding 100° C. or thereabout. By carrying the distillation out under these conditions, nearly all of the ketone product may be recovered in unpolymerized form. The catalyst and the small amount of high boiling material remaining from the distillation is removed, e. g. through outlet 28. The mixture of water and unsaturated ketone which distills is condensed in cooler 30, and drains therefrom into separator 34 where the unsaturated ketone and the water are separated. The water is drained from the separator through outlet 17. Usually it is practically free of ketone, but in some instances it may advantageously be extracted with a suitable solvent to recover residual ketone therefrom before being run to the sewer. The unsaturated ketone product is withdrawn from separator 34 through line 40, reservoir 41, line 42 and outlet 18. By operating as just described unsaturated ketones may be produced in yields greater than 90 per cent of theoretical. The method permits the production of more than 10 volumes of unsaturated ketone per hour per volume of reaction mixture in retort 5 at any moment.

The method and apparatus just described may be modified without departing from the invention. For instance, mixing chamber 1 may be eliminated and the ketol and catalyst, separately or in admixture, may be fed directly into the retort 5. Although it is advantageous to feed the ketol and the catalyst to the retort continuously, either of these starting materials may, if desired, be introduced intermittently in small quantities to the retort. Furthermore, the unsaturated ketone product may in some instances be removed from the retort by distillation alone and in some instances by drainage alone. When it is removed from the retort by drainage alone it must, of course, thereafter be separated from the catalyst-containing drainage liquor, e. g. by distillation or by extraction with a solvent, at a temperature sufficiently low to prevent excessive polymerization, e. g. the separation is preferably effected at a temperature not exceeding 100° C.

The following examples describe several ways in which the principle of the invention has been applied and illustrate certain of its advantages, but they are not to be construed as limiting the scope of the invention.

EXAMPLE 1

The purpose of this example is to demonstrate the increase in yield of unsaturated ketone obtained by passing a mixture of ketol and dehydration catalyst through a heated reaction zone and limiting the contact time, i. e. the time required for an integral portion of the mixture to pass through the zone, to less than 30 minutes, instead of heating the mixture in batch-wise manner for a longer time to dehydrate the ketol and distill the unsaturated ketone product therefrom.

Experiment a

This experiment was carried out in batch-wise manner and is presented for purpose of comparison with Experiment b which was carried out in accordance with the invention. A mixture of 250 grams of 1-hydroxy-2-methyl-butanone-3, 12.5 grams of anhydrous oxalic acid, and 2.5 grams of hydroquinone was heated at atmospheric pressure to 131° C. in a still, whereby the ketol was dehydrated and a mixture of water and methyl isopropenyl ketone was distilled. One hour 25 minutes of heating was required in order to complete the distillation. The distillate separated on standing into an oil layer (166.2 grams) and a water layer (54.8 grams). The oil layer was separated, dried, and analyzed. It contained 86.6 per cent by weight, i. e. 144.1 grams, of methyl isopropenyl ketone, the remainder being largely unreacted ketol. As residue from the distillation there was obtained 44 grams of tarry material. The yield of methyl isopropenyl ketone was 70 per cent of theoretical, based on the ketol employed, or 77 per cent, based on the ketol consumed.

Experiment b

A mixture of 316 grams of 1-hydroxy-2-methyl-butanone-3, 15.8 grams of anhydrous oxalic acid, and 3.2 grams of hydroquinone was fed in 1 hour 20 minutes into a retort, wherein it was heated at a temperature of 131° C. The ketol was thereby dehydrated and a mixture of water and methyl isopropenyl ketone was distilled. The residual liquor was drained from the retort at such rate as to maintain a charge of only about 50 grams of material in the retort at any moment. The contact time was approximately 13 minutes. The material which had been drained from the retort, was distilled under vacuum at approximately 300 millimeters pressure and the distillate was combined with that obtained directly from the retort. The combined distillate weighed 303.5 grams and consisted of 251 grams of an oil layer and 52.5 grams of a water layer. The oil layer was separated, dried, and analyzed. It contained 233.4 grams, or 93 per cent by weight, of methyl isopropenyl ketone and approximately 17.6 grams of unreacted ketol. The undistilled residue from the foregoing operations amounted to only 21.8 grams. The yield of methyl isopropenyl ketone was 89.5 per cent of theoretical, based on the amount of ketol employed, or 95 per cent, based on the ketol consumed.

EXAMPLE 2

Methyl isopropenyl ketone was produced from 1-hydroxy-2-methyl-butanone-3 by procedure similar to that described in Experiment b of Example 1, except that potassium acid sulphate in amount corresponding to 5 per cent of the weight of the ketol, instead of oxalic acid, was used as the dehydration catalyst. The yield of methyl isopropenyl ketone was 86.6 per cent of theoretical, based on the ketol consumed.

EXAMPLE 3

Methyl isopropenyl ketone was produced by procedure similar to that described in Experiment b of Example 1, except that the reaction mixture was heated in the retort to approximately 126° C. at 300 millimeters absolute pressure and the contact time, i. e. the average time over which an integral portion of the mixture was retained in the retort, was only 6.6 minutes. The yield of methyl isopropenyl ketone was 89 per cent of theoretical, based on the ketol consumed.

The method herein described may also advantageously be applied in producing other readily polymerizable unsaturated ketones from corresponding ketols. For instance, it may be applied in producing methyl vinyl ketone from 1-hydroxy-butanone-3; ethyl isopropenyl ketone from 1-hydroxy-2-methyl-pentanone-3; ethyl alpha-ethyl-vinyl ketone from 1-hydroxy-2-ethyl-pentanone-3; methyl vinyl ketone from 2-hydroxy-butanone-3; methyl isopropenyl ketone from 2-hydroxy-2-methyl-butanone-3; etc.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making a readily polymerizable unsaturated ketone having the general formula:

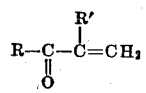

wherein R represents an alkyl radical and R' represents a member of the group consisting of hydrogen and alkyl radicals, by heating a corresponding ketol in the presence of a dehydration catalyst, the step which consists in passing the reaction mixture through the heated reaction zone at such rate that the contact time does not exceed 30 minutes.

2. In a method for making a readily polymerizable unsaturated ketone from a ketol having the general formula:

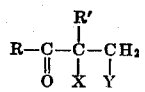

wherein R represents an alkyl radical, R' represents a member of the group consisting of hydrogen and alkyl radicals, and X and Y represent different members of the group consisting of hydrogen and the hydroxyl radical, the steps which consist in passing a mixture of the ketol and a dehydration catalyst into a reaction zone wherein it is heated to a temperature between 80° and 140° C., while withdrawing the reaction mixture from the reaction zone, the rates at which the mixture is fed into said zone and withdrawn from the zone being controlled so that the contact time does not exceed 30 minutes.

3. In a method of making a readily polymerizable unsaturated ketone, the steps which consist in passing a ketol having the general formula:

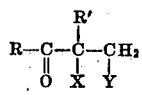

wherein R represents an alkyl radical, R' represents a member of the group consisting of hydrogen and alkyl radicals, and X and Y represent different members of the group consisting of hydrogen and the hydroxyl radical, into a reaction zone wherein it is heated in the presence of a dehydration catalyst to a reaction temperature between about 120° and about 130° C. to distill off part of the unsaturated ketone and water formed by the reaction, continuously withdrawing residual liquor from the reaction zone at such rate that the contact time of the mixture with the heated reaction zone is between about 10 minutes and about 20 minutes, distilling unsaturated ketone and water from said residual mixture at sub-atmospheric pressure, and separating the unsaturated ketone product from the water which distilled therewith.

4. In a method of making a readily polymerizable unsaturated ketone, the steps which consist in passing a ketol having the general formula:

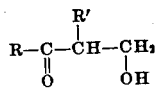

wherein R represents an alkyl radical and R' represents a member of the group consisting of hydrogen and alkyl radicals, into a reaction zone wherein it is heated in the presence of a dehydration catalyst to a reaction temperature between 80° and 140° C., and withdrawing the mixture from said zone in less than 30 minutes from the time when it enters the zone.

5. In a method of making a readily polymerizable unsaturated ketone, the steps which consist in passing a ketol having the general formula:

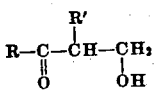

wherein R represents an alkyl radical and R' represents a member of the group consisting of hydrogen and alkyl radicals, into a reaction zone wherein it is heated to a temperature between about 120° and about 140° C. in the presence of a dehydration catalyst to distill off a portion of the unsaturated ketone and water formed, and continuously withdrawing residual liquor from the reaction zone, the rates at which ketol is fed into the reaction zone and the reaction mixture is caused to leave said zone being controlled so that the contact time is between about 10 and about 20 minutes, and distilling unsaturated ketone from said residual liquor at sub-atmospheric pressure and at a distilling temperature not higher than 100° C.

6. In a method of making a readily polymerizable unsaturated ketone, the steps which consist in dissolving a dehydration catalyst and an agent capable of inhibiting polymerization of the unsaturated ketone in a ketol having the general formula:

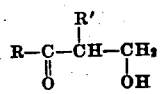

wherein R represents an alkyl radical and R' represents a member of the group consisting of hydrogen and alkyl radicals, passing the solution into a reaction zone wherein it is heated to a reaction temperature between about 120° and about 130° C. to distill off a portion of the unsaturated ketone and water formed, continuously withdrawing residual liquor from the reaction zone at such rate that the contact time is between about 10 and about 20 minutes, distilling unsaturated ketone and water from said residual mixture at sub-atmospheric pressure and at a temperature not higher than 100° C., and separating the unsaturated ketone product from the water which distilled therewith.

7. In a method of making methyl isopropenyl ketone, the steps which consist in passing 1-hydroxy-2-methyl-butanone-3 into a reaction zone wherein it is heated in the presence of a dehydration catalyst at a temperature between 80° and 140° C., withdrawing the reaction mixture from said zone in less than 30 minutes from the time when it enters the zone and distilling methyl isopropenyl ketone from the mixture at sub-atmospheric pressure and at a temperature not higher than 100° C.

8. In a method of making methyl isopropenyl ketone, the steps which consist in continuously introducing 1-hydroxy-2-methyl-butanone-3 and a dehydration catalyst into a reaction zone wherein the mixture is heated to a reaction temperature between about 120° and about 130° C. and a portion of the methyl isopropenyl ketone and water formed are distilled from the mixture, continuously withdrawing the residual liquor from the reaction zone at such rate that the contact time is between about 10 and about 20 minutes, and distilling methyl isopropenyl ketone and water from said residual mixture at sub-atmospheric pressure and at a temperature not exceeding 100° C.

9. In a method of making methyl isopropenyl ketone, the steps which consist in dissolving minor proportions of anhydrous oxalic acid and a polyhydric phenol in 1-hydroxy-2-methyl-butanone-3, passing the solution into a reaction zone wherein it is heated to a temperature between about 120° and about 130° C. and a portion of the methyl isopropenyl ketone and water formed are distilled from the mixture, continuously withdrawing residual liquor from the reaction zone so as to limit the contact time of the mixture with said zone to between about 10 and about 20 minutes, distilling a mixture of methyl isopropenyl ketone and water from said residual liquor at sub-atmospheric pressure and at a distilling temperature below 100° C., and separating the methyl isopropenyl ketone from the water which distilled therewith.

ROBERT R. DREISBACH.
GEORGE BEAL HEUSTED.